Patented Aug. 7, 1945

2,381,830

UNITED STATES PATENT OFFICE 2,381,830

MEDICINAL PREPARATION

Mervyn Joseph Lobel, New York, N. Y.

No Drawing. Application July 20, 1943,
Serial No. 495,530

7 Claims. (Cl. 167—58)

This invention relates to a composition for improving hearing. It has been and is now being successfully administered to ameliorate the condition of persons suffering from impairment in hearing, as well as tinnitus.

The primary object of the invention is to provide an injectable medicine which may be given intramuscularly in controlled amounts at daily intervals until the condition is alleviated or cured.

Another object of the invention is to provide a composition containing vitamin A combined with another constituent or constituents the presence of which render the vitamin A effective.

While the value of vitamins to overcome deficiencies in the human system is well recognized, use of such vitamins in specific pathological conditions remains the subject of considerable research.

In my studies of cases involving patients suffering from deficient hearing, I have found many cases in which vitamin preparations, including the complexes, do not of themselves produce any substantial or permanently helpful results. For instance, if in such cases vitamin A is injected alone or even with other vitamins, no alleviation of the hearing difficulty is observed.

On the other hand, when in such cases vitamin A is employed with anti-spasmodic and analgesic ingredients, and in some cases an ingredient which accelerates the effect of the preparation, the vitamin A is rendered noticeably effective to ameliorate the condition. These results have been observed over a period of several years by personal observation of patients by myself and other physicians, and are confirmed by case histories of well over a hundred patients, varying in ages from three years up to old age.

In the preparation of the composition, vitamin A, in the amount of 50,000 to 100,000 units is combined with an anti-spasmodic compound, such as cajeputol or eucalyptol, ½ to 1½ grains, an analgesic, such as guaiacol, 1 to 1¾ grains, and in some cases camphor, ¾ to 3 grains. The latter constituent is a sedative, but in addition has the particular function of accelerating the action of the vitamin. The vitamin is preferably first added to an amount of olive oil, or other suitable vehicle, to produce an injectable composition, and then the other ingredients are incorporated.

It is preferred to stabilize the vitamin by the inclusion of mixed tocopherols (vitamin E) which act as anti-oxidants and prevent deterioration of the vitamin A.

In addition to vitamin A, in some cases it is found desirable to also include vitamin $B^1$ as thiamin chloride in 33,000 unit doses.

While it is preferred to have all the constituents above mentioned present or one having their combined characteristics, I find that improvement in appreciable measure takes place when there is combined with the vitamin A the analgesic, guaiacol, and one of the specified anti-spasmodics. While the camphor is not necessary for the desired results, it is highly desirable because of its accelerating effect.

Research to determine the chemical reaction which takes place between the stabilized vitamin and the compound or compounds which render the same effective to improve hearing has so far not disclosed the precise chemical action which occurs, but it is believed that when the composition is injected, a chemical re-arrangement occurs which leads to the markedly improved results observed. In some instances it has been observed that over an extended period, crystallization of the composition occurs which is indicative of the chemical reactivity of the constituents.

It is not my claim that my invention is a cure-all. In my opinion, it is not indicated, nor would it be beneficial, to administer my combination of drugs in cases of traumatic deafness, neoplasms involving the auditory mechanism, or in long-standing cases in which there is a dead labyrinth.

I claim:

1. An injectable preparation for the treatment of impaired hearing consisting essentially of the combination of at least 50,000 units of vitamin A, guaiacol, and eucalyptol.

2. An injectable preparation for the treatment of impaired hearing consisting essentially of the combination of vitamin A, guaiacol, eucalyptol, and camphor.

3. An injectable preparation for the treatment of impaired hearing consisting essentially of the combination of vitamin A, mixed tocopherols, guaiacol, and eucalyptol.

4. An injectable preparation for the treatment of impaired hearing consisting essentially of the combination of vitamin A, mixed tocopherols, guaiacol, camphor, and eucalyptol.

5. An injectable preparation for the treatment of impaired hearing consisting essentially of the combination of vitamin A, guaiacol, eucalyptol, and a vegetable oil as an injectable vehicle.

6. An injectable preparation according to claim 1 including a vegetable oil as an injectable vehicle.

7. An injectable preparation according to claim 1 including olive oil as an injectable vehicle.

MERVYN JOSEPH LOBEL.